US011978584B2

(12) United States Patent
Hong et al.

(10) Patent No.: US 11,978,584 B2
(45) Date of Patent: May 7, 2024

(54) MAGNETIC ELEMENT AND METHOD FOR MANUFACTURING SAME

(71) Applicant: Delta Electronics (Shanghai) Co., Ltd., Shanghai (CN)

(72) Inventors: Shouyu Hong, Shanghai (CN); Jianping Ying, Shanghai (CN); Jianhong Zeng, Shanghai (CN); Chaofeng Cai, Shanghai (CN); Ganyu Zhou, Shanghai (CN); Pengkai Ji, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/301,977

(22) Filed: Apr. 17, 2023

(65) Prior Publication Data

US 2023/0253149 A1 Aug. 10, 2023

Related U.S. Application Data

(62) Division of application No. 16/653,970, filed on Oct. 15, 2019, now Pat. No. 11,664,157.

(30) Foreign Application Priority Data

Nov. 2, 2018 (CN) ......................... 201811301185.4

(51) Int. Cl.

*H01F 41/04* (2006.01)
*H01F 27/24* (2006.01)
*H01F 27/28* (2006.01)

(52) U.S. Cl.

CPC .......... *H01F 41/041* (2013.01); *H01F 27/24* (2013.01); *H01F 27/2804* (2013.01)

(58) Field of Classification Search

CPC ..... H01F 41/041; H01F 27/24; H01F 27/2804

(Continued)

(56) References Cited

U.S. PATENT DOCUMENTS 6,188,305 B1 2/2001 Chang et al.
9,001,524 B1 4/2015 Akre (Continued)

FOREIGN PATENT DOCUMENTS

EP 3648128 A2 5/2020
EP 4170689 A1 4/2023

(Continued)

OTHER PUBLICATIONS

Corresponding extended European search report dated Jun. 19, 2023.

(Continued)

*Primary Examiner* — Alfonso Perez Borroto

(74) *Attorney, Agent, or Firm* — CKC & Partners Co., LLC

(57) ABSTRACT

The present disclosure provides a magnetic element and a method for manufacturing same. The method includes: forming a first metal wiring layer on a surface of at least one segment of a magnetic core; forming a first metal protection layer on the first metal wiring layer; removing a portion of the first metal protection layer with a direct writing technique to expose a portion of the first metal wiring layer; and etching the exposed first metal wiring layer in such a manner that the first metal wiring layer forms at least one first pattern to function as a winding, where at least one turn of the first pattern surrounds the magnetic core. The magnetic element and the method for manufacturing the magnetic element provided in the present disclosure can improve space utilization of the magnetic element.

17 Claims, 12 Drawing Sheets

(58) Field of Classification Search
USPC .......................................................... 336/200
See application file for complete search history.

(56) References Cited

U.S. PATENT DOCUMENTS

| | | | | |
|---|---|---|---|---|
| 10,297,379 | B2 | 5/2019 | Gold et al. | |
| 11,664,157 | B2 * | 5/2023 | Hong | H01F 27/2804 336/200 |
| 2007/0139976 | A1 | 6/2007 | deRochemont | |
| 2010/0188183 | A1 * | 7/2010 | Shpiro | H01F 41/041 156/185 |
| 2013/0293336 | A1 | 11/2013 | Lo et al. | |
| 2016/0043569 | A1 * | 2/2016 | Dally | H02J 5/00 307/104 |
| 2016/0307686 | A1 | 10/2016 | Moon et al. | |
| 2017/0004915 | A1 | 1/2017 | Park et al. | |
| 2017/0018349 | A1 | 1/2017 | Otsubo et al. | |
| 2017/0025218 | A1 * | 1/2017 | Sugiyama | H01F 27/2804 |
| 2017/0032883 | A1 | 2/2017 | Hong et al. | |
| 2017/0178787 | A1 * | 6/2017 | Massolini | H01F 27/288 |

FOREIGN PATENT DOCUMENTS

| | | | |
|---|---|---|---|
| WO | 2020033325 | A1 | 2/2020 |
| WO | 2022006691 | A1 | 1/2022 |

OTHER PUBLICATIONS

Corresponding U.S. office action dated Aug. 11, 2023.
Office action of U.S. Appl. No. 16/671,153 dated Sep. 22, 2023.
Related Notice of Allowance of U.S. Appl. No. 17/024,720 issued on Jan. 24, 2024.
Related extended European search report of EP Application No. 23208924.3 issued on Feb. 26, 2024.

* cited by examiner

MAGNETIC ELEMENT AND METHOD FOR MANUFACTURING SAME

CROSS-REFERENCE TO RELATED APPLICATIONS

This application is a divisional application of U.S. patent application Ser. No. 16/653,970, filed on Oct. 15, 2019, which claims priority to Chinese Patent Application No. 201811301185.4, filed on Nov. 2, 2018. All of the aforementioned patent applications are hereby incorporated by reference in their entireties.

TECHNICAL FIELD

Embodiments of the present disclosure relate to the field of power electronics and, in particular, to a magnetic element and a method for manufacturing the same.

BACKGROUND

With development of electronic technologies, there are increasingly higher requirements for efficiency and space utilization of magnetic elements. Magnetic elements, like inductors or transformers, usually account for a large proportion of a power supply system in terms of both loss and volume. Therefore, provision of an inductor or a transformer of high efficiency and high space utilization has become a significant premise for a system to achieve high efficiency and high power density.

FIG. 1 is a schematic structural diagram of a ferrite spiral winding inductor in prior art. As shown in FIG. 1, the ferrite spiral winding inductor comprises a winding on a ferrite core, where the winding of a plurality of turns is formed through metallization of drill holes on the ferrite core. The inductor has a manufacturing process of: drilling a hole on the magnetic core firstly; then plating copper on an exposed surface of the magnetic core, and providing photoresist material on front and back sides of the magnetic core; exposing the copper to be etched through a process such as exposure and developing, and etching it to form a final circuit pattern; and finally removing the photoresist material to obtain the ferrite spiral winding inductor.

However, in this structure and the above manufacturing process, a connection between different layers of the winding is achieved by a through hole on the magnetic member, of which the diameter is usually more than 150 um, due to the processing, and there is usually no way to plate solid copper using the existing copper plating technique, resulting in poorer space utilization of the plating layer.

SUMMARY

Embodiments of the present disclosure provide a magnetic element and a method for manufacturing the same to solve a technical problem about low space utilization of the magnetic element.

An embodiment of the present disclosure provides a method for manufacturing a magnetic element, including:

- forming a first metal wiring layer on a surface of at least one segment of a magnetic core;
- forming a first metal protection layer on the first metal wiring layer;
- removing a portion of the first metal protection layer with a direct writing technique to expose a portion of the first metal wiring layer; and

- etching the exposed first metal wiring layer in such a manner that the first metal wiring layer forms at least one first pattern to function as a winding, wherein at least one turn of the first pattern surrounds the magnetic core.

Optionally, the method further includes:

- forming a first transition layer on the surface of the at least one segment of the magnetic core; and
- forming the first metal wiring layer on the first transition layer.

Optionally, after etching the exposed first metal wiring layer, the method further includes:

- removing a remainder of the first metal protection layer.

Optionally, the forming the first metal wiring layer on the surface of the at least one segment of the magnetic core includes:

- forming, on the surface of the at least one segment of the magnetic core through electroplating or electroless plating, the first metal wiring layer composed of copper or copper alloy.

Optionally, the forming the first metal protection layer on the first metal wiring layer includes:

- forming, on the first metal wiring layer through electroplating or electroless plating, the first metal protection layer composed of any one of tin, tin alloy, gold or gold alloy.

Optionally, the first metal protection layer is made of tin or tin alloy, and the first metal protection layer has a thickness ranging from 1 to 20 um; or the first metal protection layer is made of gold or gold alloy, and the first metal protection layer has a thickness ranging from 0.1 to 2 um.

Optionally, the magnetic core is an annular body formed by at least one magnetic segment connected end-to-end.

Optionally, the direct writing has an incident angle greater than or equal to 5° during the direct writing.

Optionally, the forming the first transition layer on the surface of the at least one magnetic segment of the magnetic core includes:

- forming the first transition layer on the surface of the at least one segment of the magnetic core by means of spraying, dipping, electrophoresis, electrostatic spraying, chemical vapor deposition, physical vapor deposition, evaporation, sputtering or printing.

Optionally, after etching the exposed first metal wiring layer, the method further includes:

- forming a second transition layer at an outer of the first metal protection layer, where the second transition layer includes at least one hole;
- forming a second metal wiring layer on the second transition layer, where the hole on the second transition layer is used to electrically connect the first metal wiring layer with the second metal wiring layer;
- forming a second metal protection layer on the second metal wiring layer;
- removing a portion of the second metal protection layer with a direct writing technique to expose a portion of the second metal wiring layer; and
- etching the exposed second metal wiring layer in such a manner that the second metal wiring layer forms at least one second pattern to function as a winding, where at least one turn of the second pattern surrounds the magnetic core.

Optionally, after etching the exposed first metal wiring layer, the method further includes:

forming a second transition layer at an outer of the first metal protection layer, where the second transition layer includes at least one hole;

forming a second metal wiring layer on the second transition layer, where the hole on the second transition layer is used to electrically connect the first metal wiring layer with the second metal wiring layer;

providing a photoresist layer on the second metal wiring layer;

exposing the photoresist layer to expose a portion of the second metal wiring layer; and etching the exposed second metal wiring layer in such a manner that the second metal wiring layer functions as a winding.

Optionally, after etching the exposed first metal wiring layer, the method further includes:

removing a remainder of the first metal protection layer;

forming a second transition layer at an outer of the etched first metal wiring layer, where the second transition layer includes at least one hole;

forming a second metal wiring layer on the second transition layer, where the hole on the second transition layer is used to electrically connect the first metal wiring layer with the second metal wiring layer;

forming a second metal protection layer on the second metal wiring layer;

removing a portion of the second metal protection layer with a direct writing technique to expose a portion of the second metal wiring layer; and etching the exposed second metal wiring layer in such a manner that the second metal wiring layer forms at least one second pattern to function as a winding, where at least one turn of the second pattern surrounds the magnetic core.

Optionally, the first transition layer is an insulating layer composed of an insulating material.

Optionally, the method further includes:

integrally assembling a plurality of magnetic cores on each of which the first pattern is formed.

In a second aspect, an embodiment of the present disclosure provides a magnetic element, including:

a magnetic core; and a first metal wiring layer covering a surface of at least one segment of the magnetic core, where a portion of the first metal wiring layer is etched to form at least one first pattern to function as a winding, and at least one turn of the first pattern surrounds the magnetic core.

Optionally, further including:

a first metal protection layer at least partially covering a region other than the etched portion of the first metal wiring layer.

Optionally, the first metal protection layer is composed of any one of tin, tin alloy, gold or gold alloy.

Optionally, further including:

a first transition layer covering the surface of the at least one segment of the magnetic core, where the first metal wiring layer covers the first transition layer.

Optionally, further including:

a second transition layer formed at an outer of the first metal wiring layer, where the second transition layer includes at least one hole; and a second metal wiring layer covering the second transition layer, where the hole on the second transition layer is used to electrically connect the first metal wiring layer with the second metal wiring layer; and where the second metal wiring layer is etched to form at least one second pattern to function as a winding, and at least one turn of the second pattern surrounds the magnetic core.

Optionally, further including:

a second metal protection layer at least partially covering a region other than the etched portion of the second metal wiring layer.

Optionally, the first metal wiring layer and the second metal wiring layer composed of copper or copper alloy.

Optionally, the first metal protection layer and the second metal protection layer composed of any one of tin, tin alloy, gold or gold alloy.

Optionally, the first metal protection layer and the second metal protection layer are made of tin or tin alloy, and the first metal protection layer and the second metal protection layer have thicknesses ranging from 1 to 20 um; or the first metal protection layer and the second metal protection layer are made of gold or gold alloy, and the first metal protection layer and the second metal protection layer have thicknesses ranging from 0.1 to 2 um.

Optionally, the first transition layer is an insulating layer composed of an insulating material.

Optionally, the magnetic core is an annular body formed by at least one magnetic segment connected end-to-end.

Optionally, a surface of the magnetic core in which the magnetic core is covered by the first pattern is not smaller than a surface of the magnetic core in which the magnetic core is not covered by the first pattern.

The magnetic element and the method for manufacturing the magnetic element provided in the present disclosure allow for: forming a first metal wiring layer on a surface of at least one segment of a magnetic core; forming a first metal protection layer on the first metal wiring layer; removing a portion of the first metal protection layer with a direct writing technique to expose a portion of the first metal wiring layer; and finally etching the exposed first metal wiring layer in such a manner that the first metal wiring layer forms at least one first pattern to function as a winding, where at least one turn of the first pattern surrounds the magnetic core. This manufacturing method needs no through hole in the magnetic member to make a connection between different layers of the winding, as in prior art, therefore, it is possible to not only improve space utilization of the magnetic element, but also improve operating efficiency of the magnetic element; the direct writing on the metal protection layer and then the etching on the metal wiring layer can help to form the winding more accurately.

BRIEF DESCRIPTION OF DRAWINGS

In order to describe technical solutions in the embodiments of the present disclosure or the prior art more clearly, accompanying drawings used in the description of the embodiments of the present disclosure will be briefly described hereunder. Obviously, the described drawings are merely some embodiments of present disclosure. For persons of ordinary skill in the art, other drawings may be obtained based on these drawings without any creative work.

DESCRIPTION OF EMBODIMENTS

Figure 1:
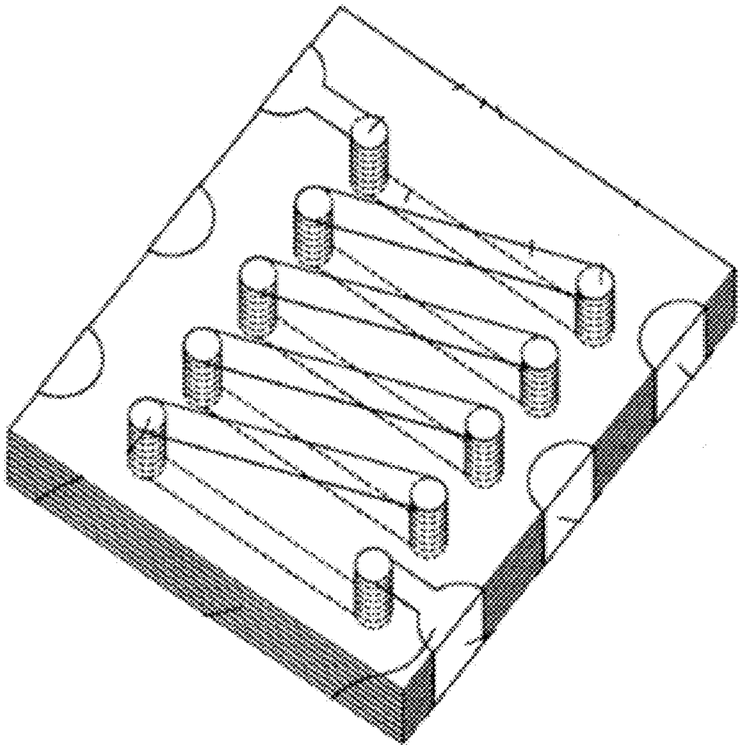
FIG. 1 is a schematic structural diagram of a ferrite spiral winding inductor in the prior art.

In order to make objectives, technical solutions, and advantages of embodiments of the present disclosure clearer, the technical solutions in the embodiments of the present disclosure will be described hereunder clearly and comprehensively with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Terms such as "first", "second", "third", "fourth", etc. (if present) in the specification and the claims as well as the described accompany drawings of the present disclosure are used to distinguish similar objects, but not intended to describe a specific order or sequence. It will be appreciated that the data used in this way may be interchangeable under appropriate circumstances, so that the embodiments of the present disclosure described herein can be implemented in an order other than those illustrated or described herein, for instance. Moreover, terms such as "include" and "have" and any variation thereof are intended to cover a non-exclusive inclusion, e.g., processes, methods, systems, products or devices that encompass a series of steps or units are not necessarily limited to those steps or units that are listed, but may include other steps or units that are not explicitly listed or inherent to these processes, methods, products or devices.

Further, the accompanying drawings are merely schematic representations of the present disclosure and are not necessarily drawn to scale. The same reference signs in the drawings represent the same or similar parts, and thus a repetitive description thereof will be omitted.

At present, the provision of the inductor of high efficiency and high space utilization is a significant premise for achieving high efficiency and high power density of a system. In order to solve this problem, in the prior art, as shown in FIG. 1, a ferrite spiral winding inductor may be used, which comprises a winding on a ferrite core, and the winding of a plurality of turns is formed through metallization of drill holes on the ferrite core. The inductor has a manufacturing process of: drilling a hole on the magnetic core firstly; then plating copper on an exposed surface of the magnetic core, and providing photoresist material on front and back sides of the magnetic core; exposing the copper to be etched through a process such as exposure and developing, and etching it to form a final circuit pattern; and finally removing the photoresist material to obtain the ferrite spiral winding inductor. However, in this structure and the above manufacturing process, firstly, since a connection between different layers of the winding is achieved by a through hole on the magnetic member, of which the diameter is usually more than 150 um, due to the processing, and there is usually no way to plate solid copper using the existing copper plating technique, resulting in poorer space utilization of the plating layer space utilization; secondly, since a certain mechanical strength and distance must be ensured between through holes, there is also a limit for the wiring density on the plane; moreover, since a filling material between the through holes is a magnetic material, a leakage flux is relatively high, which will affect the performance of the magnetic element.

Figure 2:
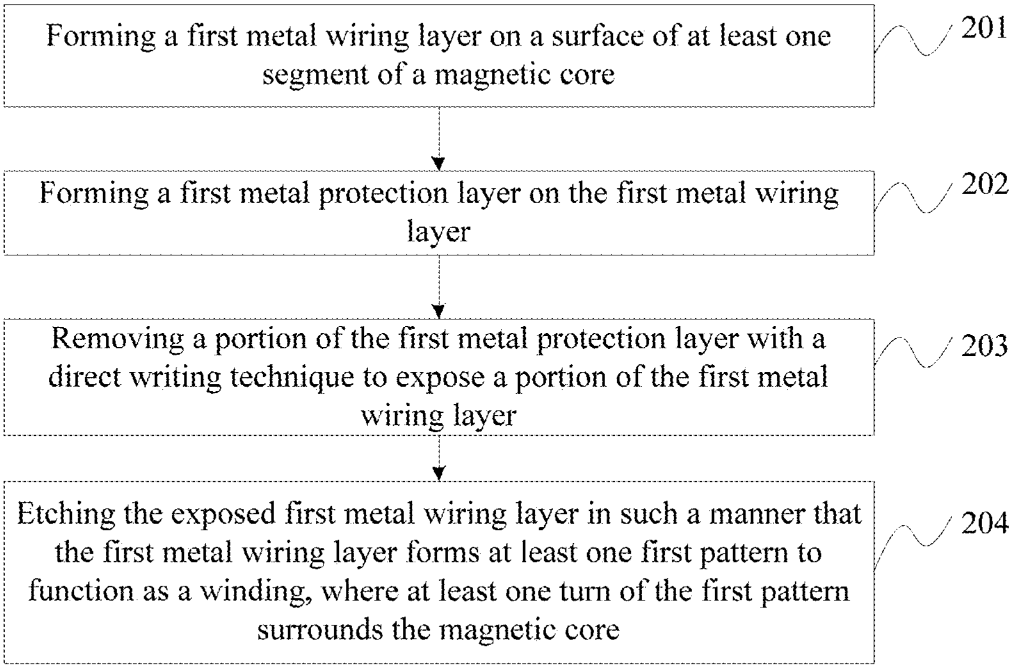
FIG. 2 is a schematic flow chart of a first embodiment of a method for manufacturing a magnetic element according to the present disclosure.

Based on the above content, it can be seen that it is very important to select a suitable manner in manufacturing a magnetic element with high efficiency and high space utilization. Therefore, in an exemplary embodiment of the present disclosure, a method for manufacturing a magnetic element is proposed. FIG. 2 is a schematic flow chart of a first embodiment of a method for manufacturing a magnetic element according to the present disclosure. As shown in FIG. 2, the method in this embodiment may include:

Step 201: forming a first metal wiring layer on a surface of at least one segment of a magnetic core.

Figure 3:
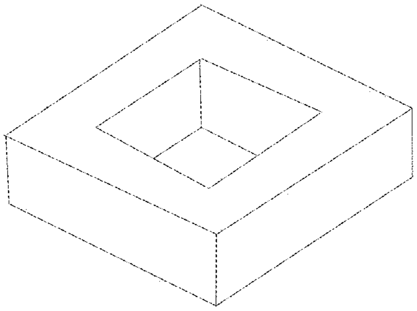
FIG. 3 is a schematic structural diagram of a magnetic core.

In this embodiment, the magnetic core may be a circular ring, or may be a triangular, a square or other shapes composed of several magnetic segments. The magnetic core is not limited in this embodiment with regard to its specific structure. FIG. 3 is a schematic structural diagram of a magnetic core. As shown in FIG. 3, in a possible implementation, the magnetic core is an annular body formed by at least one magnetic segment connected end-to-end, such as a square, where the magnetic core includes a square-shaped window. The magnetic core is integrally formed as one piece or composed of plurality of magnetic segments which are manufactured separately and connected subsequently. During the manufacturing process of the magnetic core, a window may be disposed on the magnetic core with molding process, or may be processed and formed on a magnetic substrate; the first manner has a convenience of easy processing, while the second manner has an advantage of high dimensional accuracy, however, the present disclosure is not limited thereto.

Hereinafter, description is made by taking an example where a first metal wiring layer is formed on a surface of a segment of the magnetic core. The first metal wiring layer is formed on a plurality of side surfaces of the magnetic segment, and one of the side surfaces is taken as an example for illustration, a manner to form the first metal wiring layer on another surface of the magnetic core is similar thereto, and details will not be described herein again.

Figure 4A:
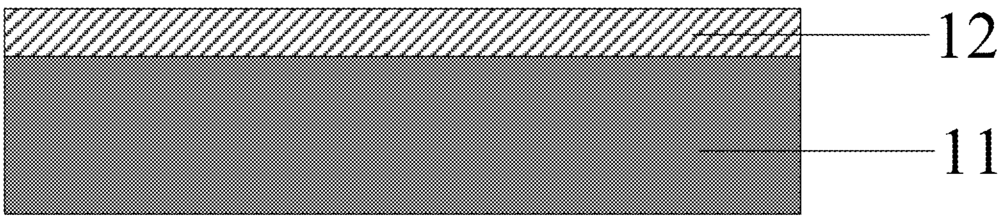
FIG. 4*a* is a schematic diagram illustrating formation of a first metal wiring layer.

FIG. 4*a* is a schematic diagram illustrating formation of a first metal wiring layer. As shown in FIG. 4*a*, a first metal wiring layer 12 is formed on a surface of at least one magnetic segment 11 of the magnetic core, where the first metal wiring layer 12 is a conductive layer. In a practical application, the first metal wiring layer 12 composed of copper or copper alloy may be formed on the surface of the at least one magnetic segment 11 of the magnetic core through electroplating or electroless plating. It should be noted, FIG. 3 only shows that a side surface of the magnetic core forms a portion of the conductive layer, but in an actual fabrication, the conductive layer (that is, the first metal wiring layer 12) is formed on a plurality of side surfaces of the magnetic core to surround the magnetic core, however, the present disclosure is not limited thereto. The conductive layer may be used to form, for example, a winding coupled with the magnetic element, and the thickness of the conductive layer may be adjusted according to a current-carrying requirement as desired. Generally, the thickness is between 10 um and 500 um, and the tolerable current usually ranges from hundreds of milliamperes to hundreds of amps.

When the first metal wiring layer 12 as desired is relatively thin (e.g., 10-20 um), it may be formed through electroless plating, however, in this case, there is generally a small flow capacity, typically 10 amps or less. When there is a greater demand for the flow capacity, the first metal wiring layer 12 may be formed by means of electroplating. Certainly, prior to the electroplating, an intermediate layer may be provided by a method such as electroless plating, sputtering or evaporation in order to enhance surface conduction and binding strength.

Step 202: forming a first metal protection layer on the first metal wiring layer.

Figure 4B:
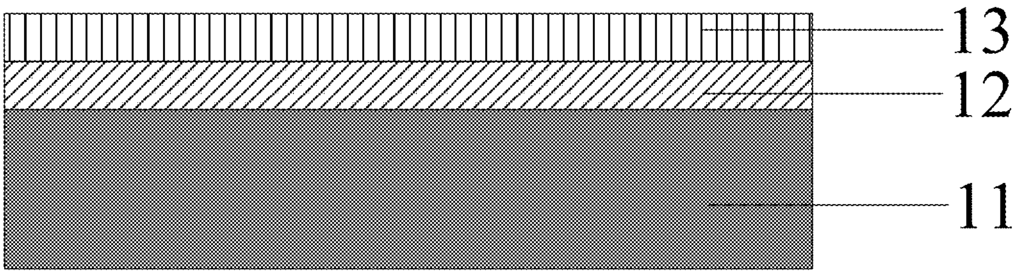
FIG. 4*b* is a schematic diagram illustrating formation of a first metal protection layer.

In this embodiment, FIG. 4*b* is a schematic diagram illustrating formation of the first metal protection layer. As shown in FIG. 4*b*, after the first metal wiring layer 12 is formed, a first metal protection layer 13 will be formed on the first metal wiring layer 12.

In a possible implementation, the first metal protection layer 13 composed any one of tin, tin alloy, gold or gold alloy may be formed on the first metal wiring layer 12 through electroplating or electroless plating. As an example, using tin as the protection layer is advantageous in that it is low in cost, and the reaction rate is extremely slow in a strong oxidizing solvent so that the protection effect is excellent. Moreover, in the embodiment, the first metal protection layer 13 may be provided using an electroplating or electroless plating process, instead of a non-metallic material such as a conventional photoresist material. Furthermore, the first metal protection layer 13 has the following advantages compared with a conventional non-metallic material: first, it is difficult to evenly coat the photoresist material such as the non-metallic material, especially in corners or the like, resulting in poor consistency of layer thickness, while the metal protection layer formed through the electroplating or electroless plating has much better conformal coating ability; second, if the non-metallic material is used as the protection layer, the first metal wiring layer 12 is generally etched using a wet etching process, after which there will be some voids below the non-metallic material, since the wet etching process has a certain isotropy, and when the non-metallic material is retained for a subsequent manufacturing process such as spraying the insulating layer, there will be a certain shadow and shadowing effect at positions of the voids below the non-metallic layer, resulting in defects such as bubbles and the like, moreover, it is also difficult to remove the non-metallic material, and may cause some problems, e.g., organic solvent pollution, long process time and surface cleaning. In summary, in the embodiment, the first metal protection layer 13 may be provided using the electroplating or electroless plating process.

In addition, in a possible implementation, the thickness of the first metal protection layer 13 may be adjusted according to properties of different metals, for example, if the first metal protection layer is made of tin or tin alloy, the first metal protection layer may have a thickness ranging from 1 to 20 um; or, if the first metal protection layer is made of gold or gold alloy, the first metal protection layer may have a thickness ranging from 0.1 to 2 um.

Step 203: removing a portion of the first metal protection layer with a direct writing technique to expose a portion of the first metal wiring layer.

Figure 4C:
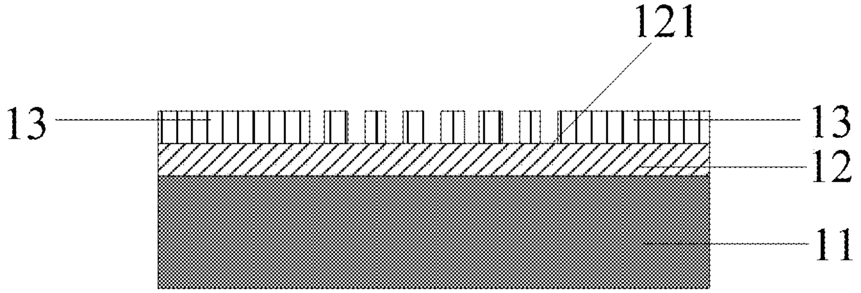
FIG. 4*c* is a schematic diagram illustrating formation of a portion of the first metal protection layer removed with a direct writing technique.

In this embodiment, FIG. 4*c* is a schematic diagram illustrating formation of a portion of the first metal protection layer removed with a direct writing technique. As shown in FIG. 4*c*, the first metal protection layer 13 is patterned through the direct writing technique to expose the portion of the first metal wiring layer 121, that is, to expose portions of the metal in the first metal wiring layer to be etched.

In a possible implementation, the direct writing technique may be, for example, a laser direct writing technique. The so-called direct writing technique is described over a conventional photolithographic process under mask protection, which is characterized in direct patterning with a focused beam, a focused electron beam, a focused ion beam or the like. With the direct writing technique, the production is flexible because it requires no mask, and a series of products may be produced according to different application requirements, so that it is possible to greatly shorten the time in getting the products into market. In addition, due to the use of the direct writing technique, samples and surface states thereof may be accurately positioned through an optical character recognition technique prior to the direct writing, based on which a direct writing path for each sample may be optimized so as to increase the yield and reduce requirements on a manufacturing process that precedes the direct writing, thereby enhancing competitiveness of the products. Moreover, since the first metal protection layer 13 is provided on the first metal wiring layer 12, the first metal wiring layer 12 may provide a good thermal isolation during the direct writing to the first metal protection layer 13, avoiding an impact on the magnetic material.

Figure 5:
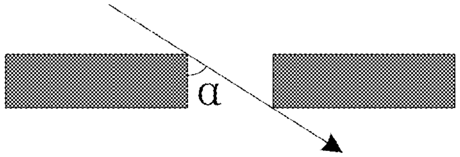
FIG. 5 is a schematic diagram illustrating an incident angle during direct writing.

It should be noted that, in order to ensure smoothness of the direct writing process, the direct writing has an incident angle of generally no less than 5° during the direct writing, that is, for a window requiring the direct writing, an incident angle of 5° or more must be ensured. FIG. 5 is a schematic diagram illustrating the incident angle during the direct writing, as shown in FIG. 5, in the direct writing, an intersection angle between an slope (defined by an intersecting line between an upper surface of the core window at the left side and an adjacent sidewall and an intersecting line between a lower surface of the core window at the right side and an adjacent sidewall) and a plane where the sidewall is located is no less than 5°, for instance, the angle α in FIG. 5 needs to be no less than 5°.

Step 204: etching the exposed first metal wiring layer in such a manner that the first metal wiring layer forms at least one first pattern to function as a winding, where at least one turn of the first pattern surrounds the magnetic core.

Figure 4D:
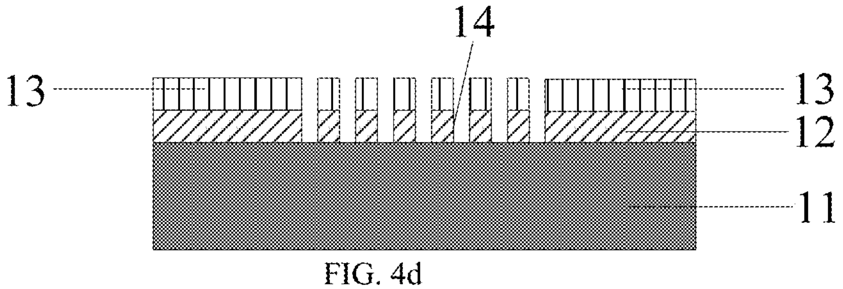
FIG. 4*d* is a schematic diagram illustrating etching of the exposed first metal wiring layer.
Figure 13:
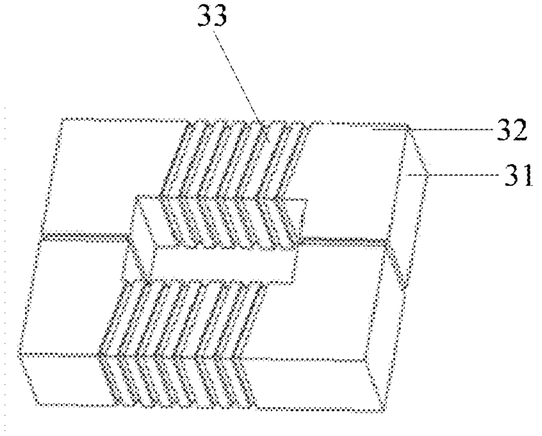
FIG. 13 is a schematic structural diagram of a magnetic element according to the present disclosure.

In this embodiment, FIG. **4*d* is a schematic diagram illustrating etching of the exposed first metal wiring layer. As shown in FIG. 4*d*, after the first metal protection layer 13 is patterned, the exposed first metal wiring layer 121 is etched, at least one first pattern 14 will be formed on the first metal wiring layer 12, where the first pattern surrounds, for example, the magnetic core (reference may be made to FIG. 13), however, the present disclosure is not limited thereto, provided that the metal wiring layer 12 having the first pattern 14 that can function as a winding. Generally, as shown in FIG. 4*d* and FIG. 13, the first patterns 14 and 33** surround the magnetic core by at least one turn.

The method for manufacturing the magnetic element provided in the embodiment of the present disclosure allows for: forming a first metal wiring layer on a surface of at least one segment of a magnetic core; forming a first metal protection layer on the first metal wiring layer; then removing a portion of the first metal protection layer with a direct writing technique to expose a portion of the first metal wiring layer; and finally etching the exposed first metal wiring layer in such a manner that the first metal wiring layer forms at least one first pattern to function as a winding. Due to the etching on the first metal wiring layer in such a manner that at least one first pattern is formed to function as a winding, a phenomenon in the prior art is avoided where a through hole in the magnetic member is required to achieve a connection between different layers of the winding, therefore, it is possible to not only improve space utilization of the magnetic element, but also improve operating efficiency of the magnetic element.

In addition, it should be noted that the above process flow is described by taking one magnetic element as an example. During an actual fabrication, a plurality of partitions may be simultaneously provided on a magnetic substrate to manufacture a plurality of magnetic elements which, in such a way, may be simultaneously manufactured in one process so that production efficiency is greatly increased.

Figure 6:
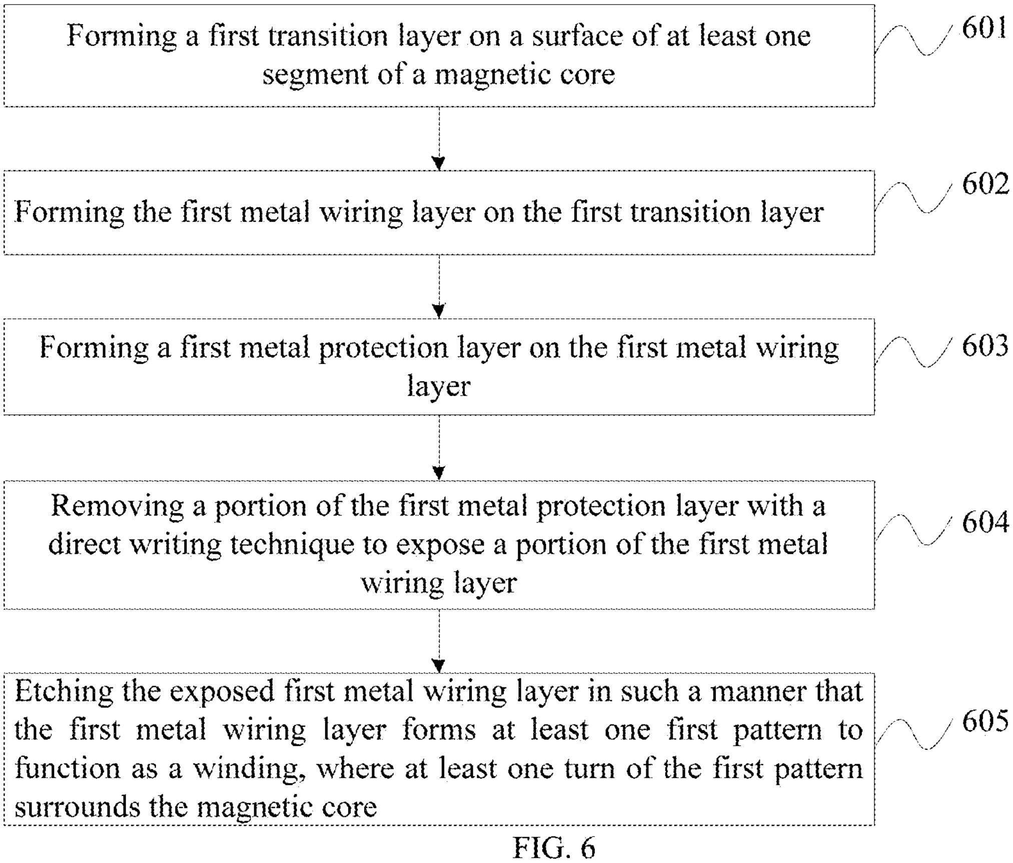
FIG. 6 is a schematic flow chart of a second embodiment of a method for manufacturing a magnetic element according to the present disclosure.

FIG. 6 is a schematic flow chart of a second embodiment of a method for manufacturing a magnetic element according to the present disclosure. In this embodiment that is based on the embodiment shown in FIG. 2, an embodiment in which a first transition layer is formed on the surface of the at least one segment of the magnetic core firstly and then the first metal wiring layer is formed on the first transition layer will be described in detail. As shown in FIG. 6, the method in this embodiment may include:

Step 601: forming a first transition layer on a surface of at least one segment of a magnetic core.

Figure 7A:
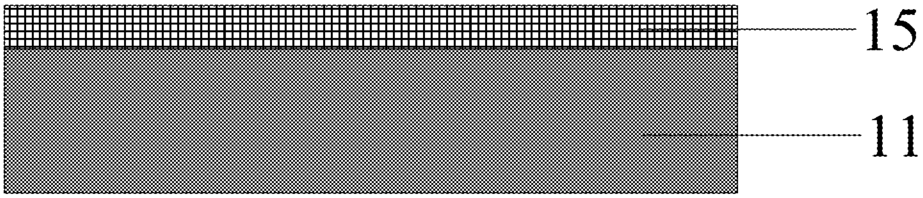
FIG. 7*a* is a schematic diagram illustrating formation of a first transition layer.

In this embodiment, FIG. **7*a* is a schematic diagram illustrating formation of a first transition layer. As shown in FIG. 7*a*, whether to form a first transition layer on the surface of the at least one magnetic segment 11 of the magnetic core may depend on whether there are certain functional requirements. The first transition layer generally has one of the following functions: (1) an insulating function, for example, when the magnetic material used is a material having low surface insulation resistance, such as MnZn ferrite, a first transition layer 15 may be added to reduce electric leakage between turns; for a transformer that needs to be safely isolated, primary and secondary winding have a higher requirement of voltage tolerance, and a first transition layer 15** may be provided on the surface of the magnetic core to meet the requirement for a safety test; in addition, the transition layer generally used as the insulating layer is made of epoxy resin, silicone, acetal materials, polyester materials, polyester imine materials, polyimide materials or parylene; 2) a binding strength enhancing function, for example, when a binding strength between the surface of the magnetic material and the subsequent metal wiring layer is poor, a binding strength enhancing coating such as an epoxy resin may be coated to enhance the binding strength between the surface of the magnetic material and the subsequent layer, or such that a good binding strength may be easily derived through subsequent surface treatment (such as coarsening or surface modification process); (3) a stress releasing function, for example, when the selected magnetic material is a stress sensitive material, such as ferrite materials, a stress-release material such as silicone may be provided in order to avoid or reduce a stress caused by a subsequent manufacturing process on the magnetic material, which may result in deterioration of magnetic properties, such as increased loss or reduced magnetic permeability, etc.; (4) magnetic core protection, for example, to prevent the material that is directly adjacent to the magnetic core from affecting the properties of the magnetic material; and (5) a surface smoothing function, for example, improving surface evenness of the magnetic core to facilitate a subsequent manufacturing process, and the like.

In a possible implementation, the first transition layer 15 may be formed on the surface of the at least one magnetic segment 11 of the magnetic core by means of spraying, dipping, electrophoresis, electrostatic spraying, chemical vapor deposition, physical vapor deposition, sputtering, evaporation or printing.

In a possible implementation, the first transition layer 15 is an insulating layer composed of an insulating material.

Step 602: forming the first metal wiring layer on the first transition layer.

Figure 7B:
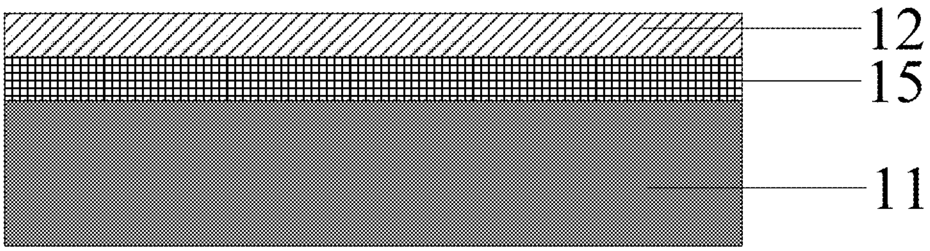
FIG. 7*b* is another schematic diagram illustrating formation of the first metal wiring layer.

In this embodiment, FIG. **7*b* is another schematic diagram illustrating formation of the first metal wiring layer. As shown in FIG. 7*b*, after the formation of the first transition layer 15, the first metal wiring layer 12 will be formed on the first transition layer 15. A manner in which the first metal wiring layer 12 is formed on the first transition layer 15 is similar to a manner in which the first metal wiring layer 12 is formed on the surface of the at least one magnetic segment 11** of the magnetic core, and details will not be described herein again.

Step 603: forming a first metal protection layer on the first metal wiring layer.

Step 604: removing a portion of the first metal protection layer with a direct writing technique to expose a portion of the first metal wiring layer.

Step 605: etching the exposed first metal wiring layer in such a manner that the first metal wiring layer forms at least one first pattern to function as a winding, where at least one turn of the first pattern surrounds the magnetic core.

Steps 603-605 are similar to Steps 202-204, and details of which will not be described herein again, where at least one turn of the first pattern surrounds the magnetic core. The first pattern is, for example, a spiral type surrounding the magnetic core.

In addition, in a possible implementation, after etching the exposed first metal wiring layer, a remainder of the first metal protection layer may also be removed.

Specifically, whether or not to remove the first metal protection layer 13 may depend on the material of the first metal protection layer 13. For example, when tin or tin alloy is used as the protection layer, after a pattern is etched on the covered metal layer, removing the protection layer using an etching solution may be selected as appropriate. Certainly, if the protection layer is made of gold, it may be retained. Since the protection layer of gold has an extremely thin thickness, an edge portion may also be removed by a water jet cutting process, a sand blasting process or an ultrasonic process.

According to the method for manufacturing the magnetic element provided in this embodiment of the present disclosure, a first transition layer is formed on the surface of the at least one segment of the magnetic core firstly, and then the first metal wiring layer is formed on the first transition layer, since the first transition layer may have one of an insulating function, a bonding strength enhancing function, a stress releasing function, and a surface smoothing function, performance of the magnetic element may be improved.

Figure 8:
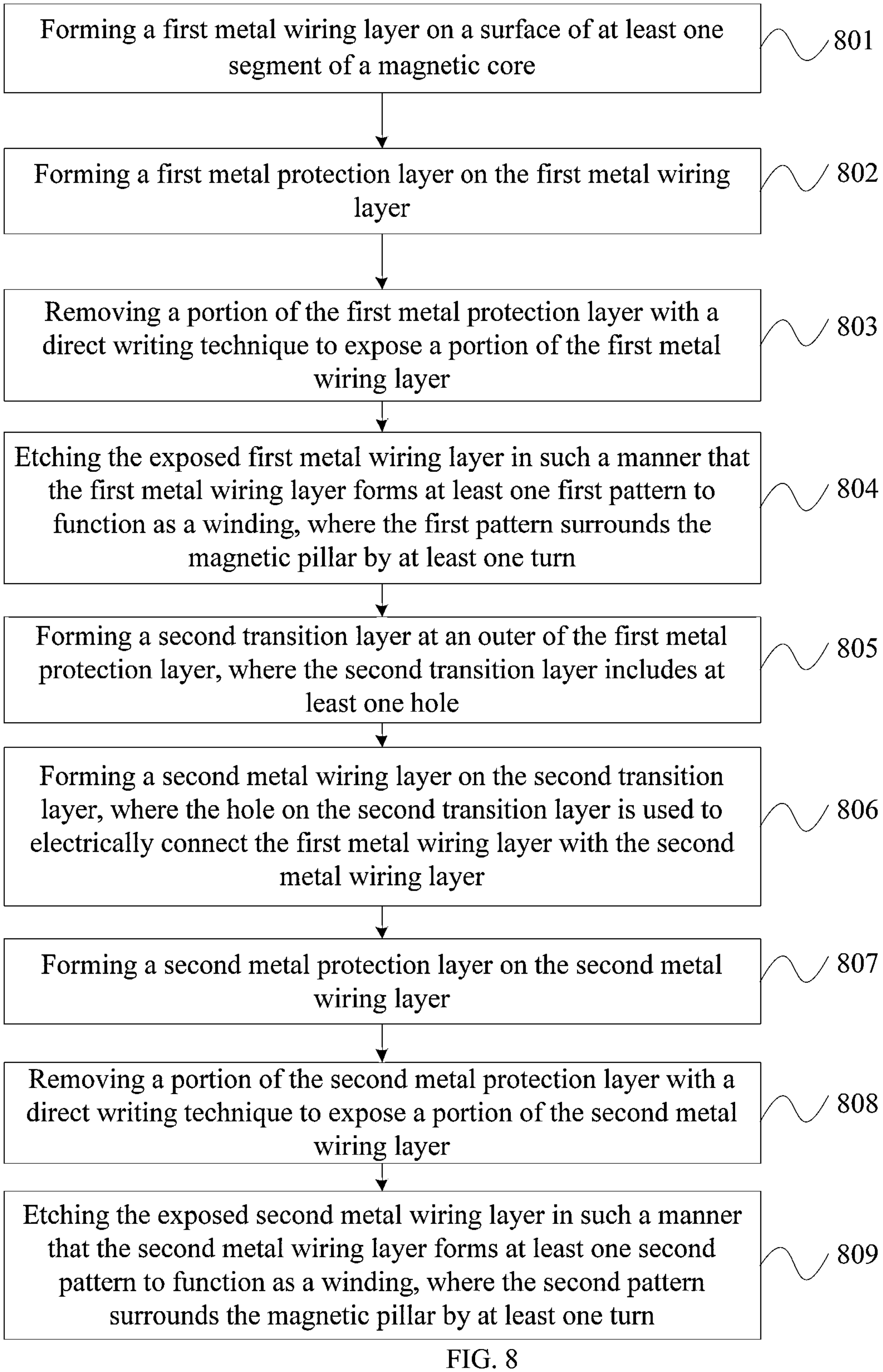
FIG. 8 is a schematic flow chart of a third embodiment of a method for manufacturing a magnetic element according to the present disclosure.

FIG. 8 is a schematic flow chart of a third embodiment of a method for manufacturing a magnetic element according to the present disclosure. In this embodiment that is based on each of the embodiments described above, an embodiment in which a plurality of metal wiring layers is manufactured will be described in detail. As shown in FIG. 8, the method in this embodiment may include:

Step 801: forming a first metal wiring layer on a surface of at least one segment of a magnetic core.

Step 802: forming a first metal protection layer on the first metal wiring layer.

Step 803: removing a portion of the first metal protection layer with a direct writing technique to expose a portion of the first metal wiring layer.

Step 804: etching the exposed first metal wiring layer in such a manner that the first metal wiring layer forms at least one first pattern to function as a winding, where at least one turn of the first pattern surrounds the magnetic core.

Steps 801-804 are similar to Steps 201-204, and details will not be described herein again.

Step 805: forming a second transition layer at an outer of the first metal protection layer, where the second transition layer includes at least one hole.

Figure 9A:
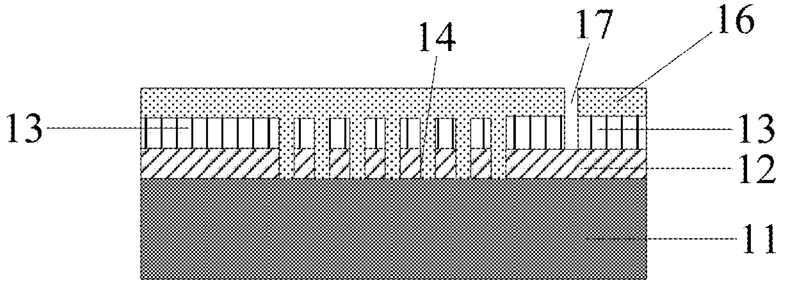
FIG. 9*a* is a schematic diagram illustrating formation of a second transition layer.

In this embodiment, FIG. 9*a* is a schematic diagram illustrating formation of a second transition layer. As shown in FIG. 9*a*, if two layers of wiring need to be arranged on the magnetic element, the above manufacturing Steps 801-804 may be repeated after a second transition layer is formed. It should be noted that, in multi-layered wiring, only when processing the wiring layer closest to the magnetic core, the transition layer can be selectively used as appropriate (e.g., according to material properties), whereas in the wiring for each subsequent layer, this step will be performed to enhance insulating properties, that is, forming a second transition layer 16 at an outer of the first metal protection layer 13.

In addition, the second transition layer 16 includes at least one hole 17. Since the second transition layer 16 is thin, which generally has a thickness of less than 200 um, a laser may be then used for drilling the hole 17 in most cases; the hole has a small diameter, and a good electroplating fill rate may be achieved by adjusting an electroplating recipe, even a solid copper pillar may be filled in a blind hole.

Step 806: forming a second metal wiring layer on the second transition layer, where the hole on the second transition layer is used to electrically connect the first metal wiring layer with the second metal wiring layer.

Figure 9B:
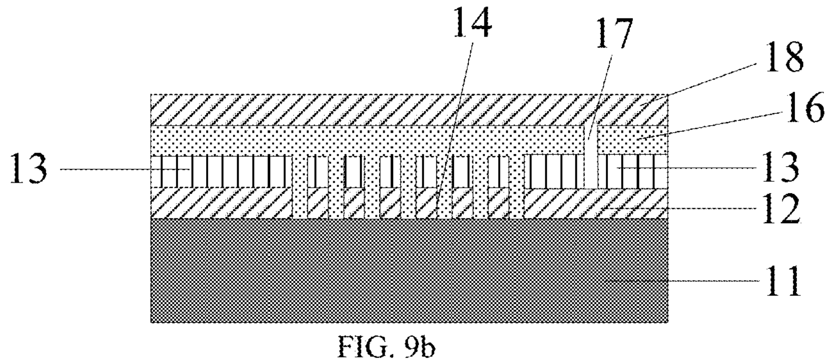
FIG. 9*b* is a schematic diagram illustrating formation of a second metal wiring layer.

In this embodiment, FIG. 9*b* is a schematic diagram illustrating formation of a second metal wiring layer. As shown in FIG. 9*b*, after the second transition layer 16 is formed, a second metal wiring layer 18 will be formed on the second transition layer 16, and a hole 17 on the second transition layer 16 is used to electrically connect the first metal wiring layer 12 with the second metal wiring layer 18. It should be noted that the hole 17 in the drawing is directly connected to the first metal wiring layer 12, and may also be connected to the first metal protection layer 13 in practice. Since the first metal protection layer 13 in the present disclosure is made of metal, it does not degrade the electrical connection. Compared to the conventional method where a through hole is implemented in the magnetic member, because an insulation requirement between the holes can be met more easily, and there is no need to drill the magnetic member, the space utilization of the magnetic element will be greatly improved, since the through hole implemented in the magnetic member is large in scale, generally having a diameter greater than 150 um, and a spacing between holes is also generally greater than 150 um. In addition, it should be noted that the above process flow is described by taking one magnetic element as an example. During an actual fabrication, a plurality of partitions may be provided on a magnetic substrate to manufacture magnetic elements which, in such a way, may be simultaneously manufactured in one process so that production efficiency is greatly increased.

Step 807: forming a second metal protection layer on the second metal wiring layer.

Figure 9C:
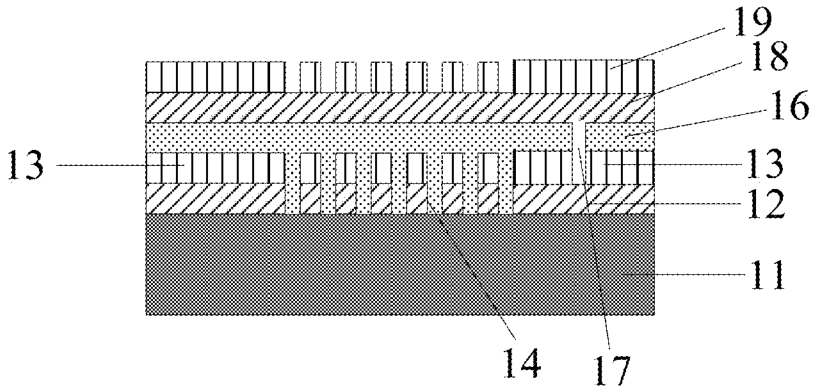
FIG. 9*c* is a schematic diagram illustrating a second metal protection layer after its formation and direct writing.

In this embodiment, FIG. 9*c* is a schematic diagram illustrating formation of a second metal protection layer. As shown in FIG. 9*c*, a second metal protection layer 19 may be formed on the second metal wiring layer 18, and a specific formation method thereof is similar to that of the first metal protection layer 13, thus details will not be described herein again.

Step 808: removing a portion of the second metal protection layer with a direct writing technique to expose a portion of the second metal wiring layer.

Proceed with FIG. 9*c*, after a portion of the second metal protection layer 19 is removed with the direct writing technique, a portion of the second metal wiring layer 18 is exposed. A manner in which the portion of the second metal protection layer 19 is removed is similar to a manner in which the portion of the first metal protection layer 13 is removed, and details will not be described herein again.

Step 809: etching the exposed second metal wiring layer in such a manner that the second metal wiring layer forms at least one second pattern to function as a winding, where at least one turn of the second pattern surrounds the magnetic core.

Figure 9D:
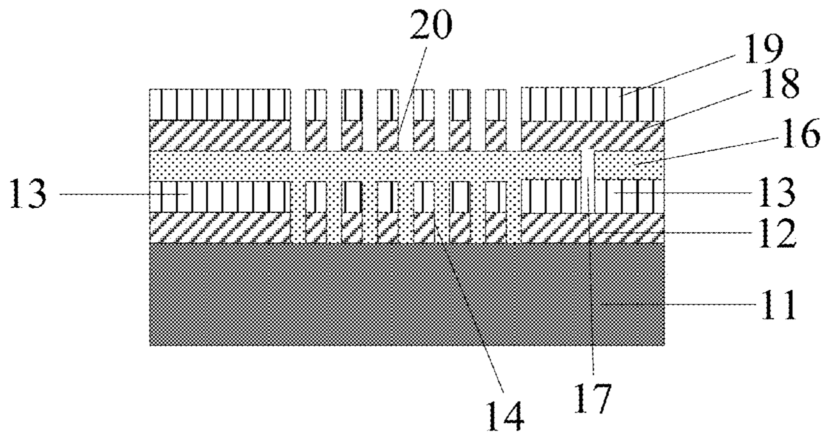
FIG. 9*d* is a schematic diagram illustrating etching of the exposed second metal wiring layer.

In this embodiment, FIG. 9*d* is a schematic diagram illustrating etching of the exposed second metal wiring layer. As shown in FIG. 9*d*, after the exposed second metal wiring layer 18 is etched, at least one second pattern 20 will be formed on the second metal wiring layer 18, where the second pattern 20 will function as a winding, and the second pattern also typically surrounds the magnetic core by at least one turn. In addition, the first pattern 14 and the second pattern 20 may be the same pattern, for example, a three-dimensional spiral type surrounding the magnetic core, or may be different patterns, which is not limited in this embodiment.

Notably, it is also possible to arrange layers of wiring on the magnetic element. During a specific implementation, how many times the above process needs to be repeated will depend on the number of wiring layers required.

The method for manufacturing the magnetic element provided in the embodiment of the present disclosure allows for: forming a second transition layer at an outer of the first metal protection layer, where the second transition layer includes at least one hole; forming a second metal wiring layer on the second transition layer, where the hole on the second transition layer is used to electrically connect the first metal wiring layer with the second metal wiring layer; then forming a second metal protection layer on the second metal wiring layer; removing a portion of the second metal protection layer with a direct writing technique to expose a portion of the second metal wiring layer; and finally etching the exposed second metal wiring layer in such a manner that the second metal wiring layer forms at least one second pattern to function as a winding. Since a second transition layer is formed at the outer of the first metal protection layer, and the second metal wiring layer is formed on the second transition layer, so that two layers of wiring may be arranged, whereby space utilization of the magnetic element may be improved. A design of more metal wiring layers may also be analogized in accordance with the embodiment of the present disclosure. It should be noted that the first metal protection layer and/or the second metal protection layer may be entirely removed after selective etching of the first metal wiring layer and the second metal wiring layer is completed. It should be noted that, the hole on the second transition layer could be used to electrically connect any functional pattern on different metal wiring layers while not limited to windings of the magnetic element.

Figure 10:
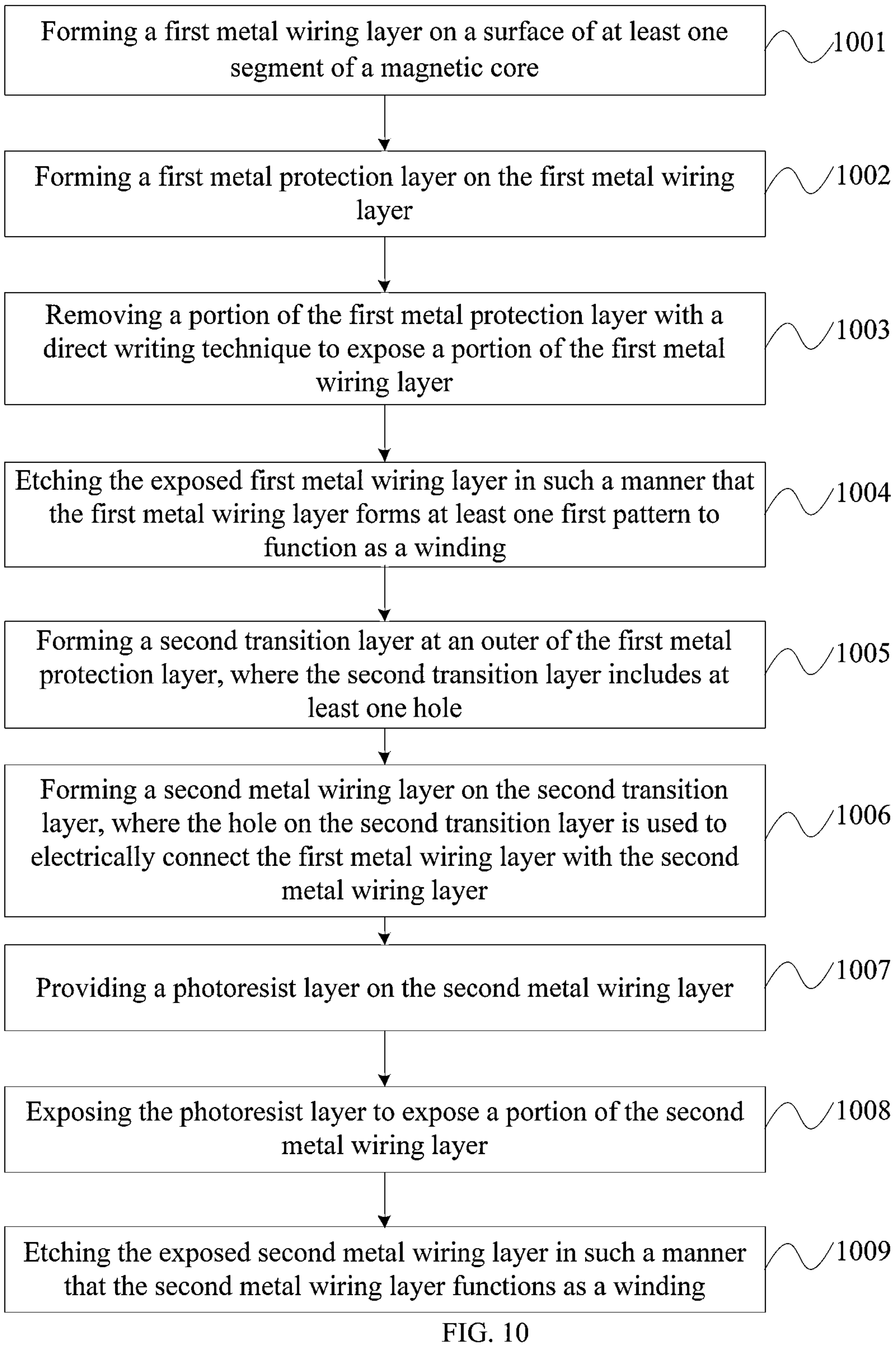
FIG. 10 is a schematic flow chart of a fourth embodiment of a method for manufacturing a magnetic element according to the present disclosure.

FIG. 10 is a schematic flow chart of a fourth embodiment of a method for manufacturing a magnetic element according to the present disclosure. In this embodiment that is based on embodiments as shown in FIG. 2 and FIG. 6, a further embodiment in which a plurality of metal wiring layers is manufactured will be described in detail. A difference between this embodiment and the embodiment as shown in FIG. 8 is that, in this embodiment, a portion of the second metal wiring layer that needs to be processed and etched (such as a slit) may be on a plane and, at this point, a photoresist layer may be provided on at least a portion of the second metal wiring layer, and may be exposed in a photolithography manner to expose a portion of the second metal wiring layer. As shown in FIG. 10, the method in this embodiment may include:

Step 1001: forming a first metal wiring layer on a surface of at least one segment of a magnetic core.

Step 1002: forming a first metal protection layer on the first metal wiring layer.

Step 1003: removing a portion of the first metal protection layer with a direct writing technique to expose a portion of the first metal wiring layer.

Step 1004: etching the exposed first metal wiring layer in such a manner that the first metal wiring layer forms at least one first pattern to function as a winding.

Steps 1001-1004 are similar to Steps 201-204, and details will not be described herein again.

Step 1005: forming a second transition layer at an outer of the first metal protection layer, where the second transition layer includes at least one hole.

Step 1006: forming a second metal wiring layer on the second transition layer, where the hole on the second transition layer is used to electrically connect the first metal wiring layer with the second metal wiring layer.

Steps 1005-1006 are similar to Steps 805-806, and details will not be described herein again.

Step 1007: providing a photoresist layer on the second metal wiring layer.

Step 1008: exposing the photoresist layer to expose a portion of the second metal wiring layer.

In this embodiment, if the magnetic element has one layer of primary winding plus one layer of secondary winding which has one turn, for a metal wiring layer corresponding to the secondary winding, only one slit needs to etched so that the metal wiring layer forms a winding of one turn. At this point, a photoresist layer may be provided on the second metal wiring layer, and a photolithographic process may be performed on the photoresist layer.

Step 1009: etching the exposed second metal wiring layer in such a manner that the second metal wiring layer functions as a winding.

In this embodiment, after the exposed second metal wiring layer is etched, at least one pattern is formed on the second metal wiring layer to function as a winding, and at least one turn of each of the first pattern and the second pattern formed generally surrounds the magnetic core.

The method for manufacturing the magnetic element provided in the embodiment of the present disclosure allows for: forming a second transition layer at an outer of the first metal protection layer, where the second transition layer includes at least one hole; forming a second metal wiring layer on the second transition layer, where the hole on the second transition layer is used to electrically connect the first metal wiring layer with the second metal wiring layer; then providing a photoresist layer on the second metal wiring layer; exposing the photoresist layer to expose a portion of the second metal wiring layer; and finally etching the exposed second metal wiring layer in such a manner that the second metal wiring layer functions as a winding. Since a second transition layer is formed at the outer of the first metal protection layer, and the second metal wiring layer is formed on the second transition layer, so that two layers of wiring may be arranged, whereby space utilization of the magnetic element may be improved. It should be noted that, in this process, a protection layer material corresponding to the first metal wiring layer and a protection layer material corresponding to the second metal wiring layer may be chosen according to actual conditions, for example, the protection layer material corresponding to the first wiring layer is a photoresist, while the protection material corresponding to the second wiring layer is metal, a preferred principle is that when a pattern that needs to be formed on the sidewall is simple, the pattern may be defined and formed by a conventional photoresist material. It should be noted that, the hole on the second transition layer could be used to electrically connect any functional pattern on different metal wiring layers while not limited to windings of the magnetic element.

Figure 11:
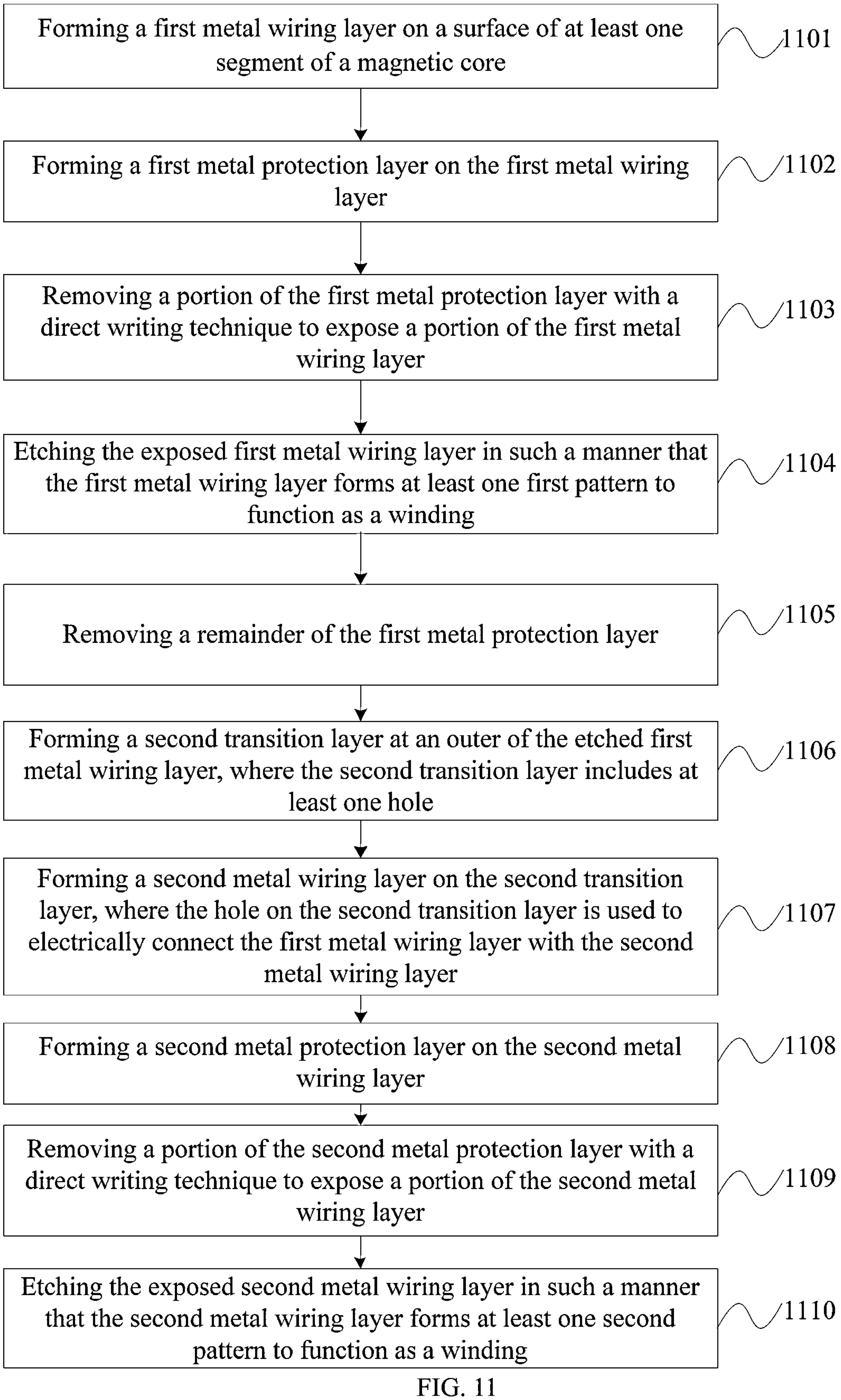
FIG. 11 is a schematic flow chart of a fifth embodiment of a method for manufacturing a magnetic element according to the present disclosure.

FIG. 11 is a schematic flow chart of a fifth embodiment of a method for manufacturing a magnetic element according to the present disclosure. In this embodiment that is based on the embodiments as shown in FIG. 2 and FIG. 6, an embodiment in which a remainder of the first metal protection layer may be removed after the exposed first metal wiring layer is etched and a second transition layer is formed at an outer of the first metal wiring layer after the remainder of the first metal protection layer is removed will be described in detail. As shown in FIG. 11, the method in this embodiment may include:

Step 1101: forming a first metal wiring layer on a surface of at least one segment of a magnetic core.

Step 1102: forming a first metal protection layer on the first metal wiring layer.

Step 1103: removing a portion of the first metal protection layer with a direct writing technique to expose a portion of the first metal wiring layer.

Step 1104: etching the exposed first metal wiring layer in such a manner that the first metal wiring layer forms at least one first pattern to function as a winding.

Steps 1101-1104 are similar to Steps 201-204, and details will not be described herein again.

Step 1105: removing a remainder of the first metal protection layer.

Figure 12A:
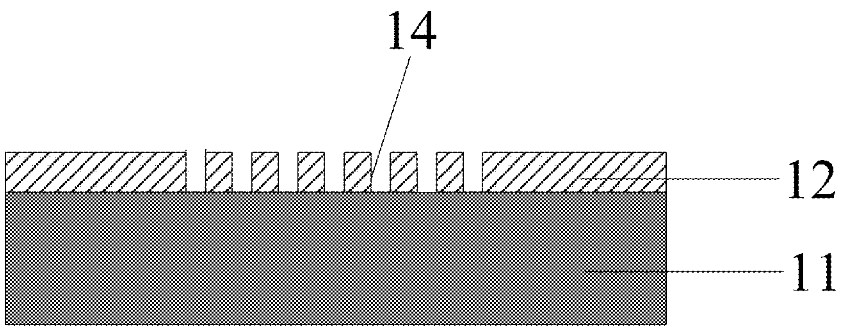
FIG. 12*a* is a schematic diagram illustrating removing of the first metal protection layer.

In this embodiment, FIG. 12*a* is a schematic diagram illustrating removing of the first metal protection layer. As shown in FIG. 12*a*, a remainder of the first metal protection layer 13 may be removed with reference to FIG. 4*d*. Specifically, whether or not to remove the first metal protection layer may depend on the material of the first metal protection layer. For example, when tin or tin alloy is used as the protection layer, removing the protection layer of tin using an etching solution may be selected as appropriate. Certainly, if the protection layer is made of gold or gold alloy, it may be retained. Since the protection layer of gold has an extremely thin thickness, an edge portion may be removed by a water jet cutting process, a sand blasting process or an ultrasonic process.

Step 1106: forming a second transition layer at an outer of the etched first metal wiring layer, where the second transition layer includes at least one hole.

Figure 12B:
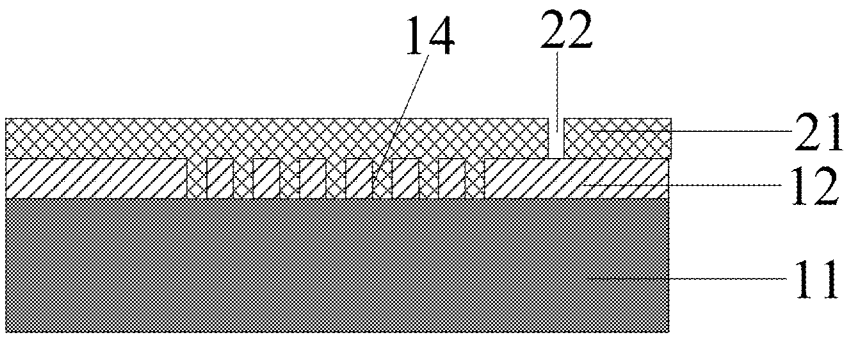
FIG. 12*b* is another schematic diagram illustrating formation of the second transition layer.

In this embodiment, FIG. 12*b* is another schematic diagram illustrating formation of the second transition layer. As shown in FIG. 12*b*, if two layers of wiring need to be arranged on the magnetic element, the above manufacturing Steps 1101-1104 may be repeated after the second transition layer 21 is formed.

In addition, the second transition layer 21 includes at least one hole 22. Since the second transition layer 21 is thin, which generally has a thickness of less than 200 um, a laser may be then used for drilling the hole 22 in most cases; the hole has a small diameter, and a good electroplating fill rate may be achieved by adjusting an electroplating recipe, even a solid copper pillar may be filled in a blind hole.

Step 1107: forming a second metal wiring layer on the second transition layer, where the hole on the second transition layer is used to electrically connect the first metal wiring layer with the second metal wiring layer.

Figure 12C:
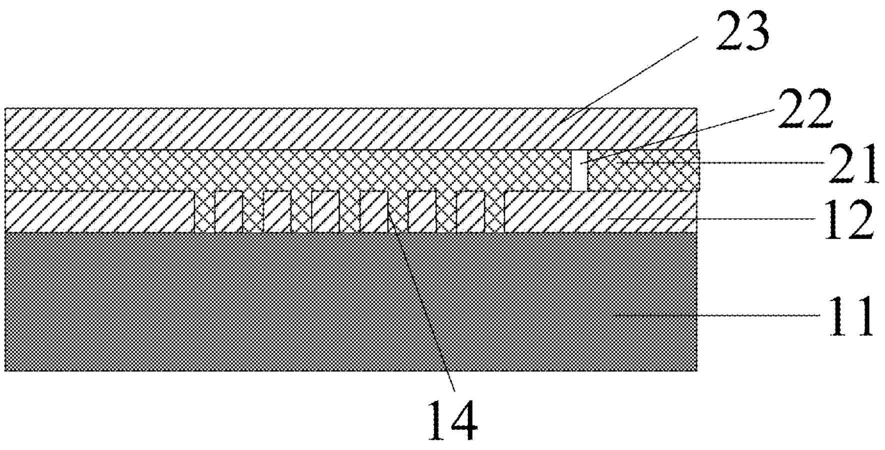
FIG. 12*c* is another schematic diagram illustrating formation of the second metal wiring layer.

In this embodiment, FIG. 12*c* is another schematic diagram illustrating formation of the second metal wiring layer. As shown in FIG. 12*c*, after the second transition layer 21 is formed, a second metal wiring layer 23 will be formed on the second transition layer 21, and a hole 22 on the second transition layer 21 is used to electrically connect the first metal wiring layer 12 with the second metal wiring layer 23.

Step 1108: forming a second metal protection layer on the second metal wiring layer.

Figure 12D:
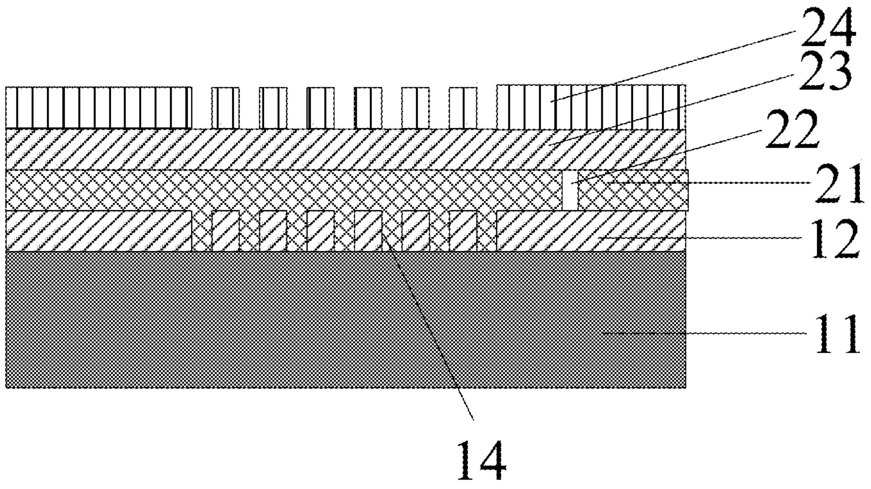
FIG. 12*d* is another schematic diagram illustrating formation of the second metal protection layer.

In this embodiment, FIG. 12*d* is another schematic diagram illustrating formation of the second metal protection layer. As shown in FIG. 12*d*, a second metal protection layer 24 may be formed on the second metal wiring layer 23, and a specific formation method thereof is similar to that of the first metal protection layer 13, thus details will not be described herein again.

Step 1109: removing a portion of the second metal protection layer with a direct writing technique to expose a portion of the second metal wiring layer.

Proceed with FIG. 12*d*, after the portion of the second metal protection layer 24 is removed with the direct writing technique, the portion of the second metal wiring layer 23 is exposed. A manner in which the portion of the second metal protection layer 24 is removed is similar to a manner in which the portion of the first metal protection layer 13 is removed, and details will not be described herein again.

Step 1110: etching the exposed second metal wiring layer in such a manner that the second metal wiring layer forms at least one second pattern to function as a winding.

Figure 12E:
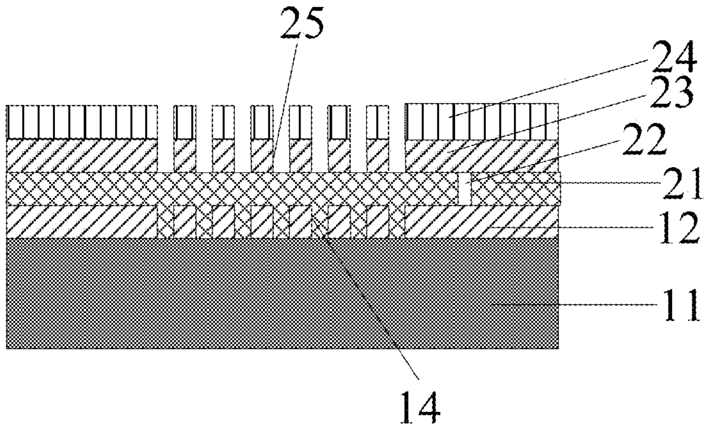
FIG. 12*e* is a schematic diagram illustrating etching of the exposed second metal wiring layer.

In this embodiment, FIG. 12*e* is a schematic diagram illustrating etching of the exposed second metal wiring layer. As shown in FIG. 12*e*, after the exposed second metal wiring layer 23 is etched, at least one second pattern 25 will be formed on the second metal wiring layer 23, where the second pattern 25 will function as a winding, and at least one turn of each of the first pattern and the second pattern formed generally surrounds the magnetic core. In addition, the first pattern 14 and the second pattern 25 may be the same pattern or may be different patterns, which is not limited in this embodiment.

Steps 1108-1110 are similar to Steps 807-809, and details will not be described herein again.

It should be noted that, on the basis of the above embodiments, a plurality of magnetic cores on each of which the first pattern is formed may be integrally assembled in order to improve manufacturing efficiency of magnetic element, that is, after respective magnetic segments of the magnetic core are manufactured with first patterns, they are then assembled into an integral magnetic element.

FIG. 13 is a partial schematic structural diagram of a magnetic element according to an embodiment of the present disclosure. As shown in FIG. 13, the magnetic element includes: a magnetic core 31 and a first metal wiring layer 32 covering a surface of at least one segment of the magnetic core, where a portion of the first metal wiring layer 32 is etched to form at least one first pattern 33, the first pattern 33 is of a three-dimensional spiral type surrounding the magnetic core, the magnetic core passes through the first pattern 33, and the first pattern 33 functions as a winding around the magnetic core.

Specifically, the magnetic core 31 may be a circular ring, or a triangular, a square or other shapes composed of several magnetic segments. The magnetic core is not limited in this embodiment with regard to its specific structure. In a possible implementation, the magnetic core 31 is an annular body formed by at least one magnetic segment connected end-to-end, such as a square where the magnetic core 31 includes a square-shaped window.

A surface of at least one segment of the magnetic core 31 is covered with the first metal wiring layer 32, where the first metal wiring layer 32 is a conductive layer and is made of copper or cooper alloy. In addition, a portion of the first metal wiring layer 32 is etched to form at least one first pattern 33 to function as a winding, and at least one turn of the first pattern generally surrounds the magnetic core.

The magnetic element according to the embodiment of the present disclosure includes a magnetic core and a first metal wiring layer covering a surface of at least one segment of the magnetic core, where a portion of the first metal wiring layer is etched to form at least one first pattern to function as a winding, whereby space utilization of the magnetic element may be improved.

Optionally, on the basis of the above embodiments, the magnetic element further includes a first metal protection layer covering a region other than the etched portion of the first metal wiring layer.

Specifically, a first metal protection layer is further coated on a portion of the first wiring layer that is not etched, where a material of the first metal protection layer may be provided as any one of tin, tin alloy, gold or gold alloy. The thickness of the first metal protection layer may be adjusted according to properties of different metals, for example, if the first metal protection layer is made of tin or tin alloy, the first metal protection layer has a thickness ranging from 1 to 20 um; or, if the first metal protection layer is made of gold or gold alloy, the first metal protection layer has a thickness ranging from 0.1 to 2 um.

Optionally, on the basis of the above embodiments, the magnetic element further includes a first transition layer covering the surface of the at least one segment of the magnetic core, where the first metal wiring layer covers the first transition layer.

Specifically, the first transition layer may be an insulating layer composed of an insulating material. The first transition layer generally has the following functions: (1) an insulating function; (2) a binding strength enhancing function; (3) a stress releasing function; (4) magnetic core protection; and (5) a surface smoothing function, which are similar to the foregoing description, and details will not be described herein again.

Optionally, on the basis of the embodiment as shown in FIG. 13, the magnetic element further includes: a second transition layer formed at an outer of the first metal wiring layer, where the second transition layer includes at least one hole; and a second metal wiring layer covering the second transition layer, where the hole on the second transition layer is used to electrically connect the first metal wiring layer with the second metal wiring layer, where the second metal wiring layer is etched to form at least one second pattern to function as a winding.

Specifically, if the magnetic element includes two wiring layers, the magnetic element will further include a second transition layer formed at an outer of the first metal wiring layer, where the second transition layer includes at least one hole, each hole respectively acting as an input or an output, and the hole may be used to electrically connect the first metal wiring layer with the second metal wiring layer. In addition, at least one first pattern formed by etching the first metal wiring layer and at least one second pattern formed by etching the second metal wiring layer may be the same or may be different.

When the magnetic element includes two wiring layers, the magnetic element further includes a second metal protection layer covering a region other than the etched portion of the second metal wiring layer.

Specifically, a material of the second metal protection layer may be any one of tin, tin alloy, gold or gold alloy. The thickness of the second metal protection layer may be adjusted according to properties of different metals, for example, if the second metal protection layer is made of tin or tin alloy, the second metal protection layer has a thickness ranging from 1 to 20 um; or, if the second metal protection layer is made of gold or gold alloy, the second metal protection layer has a thickness ranging from 0.1 to 2 um.

Optionally, on the basis of the above embodiments, a surface of a region of the magnetic core in which the magnetic core is covered by the first pattern is not smaller than a surface of a region of the magnetic core in which the magnetic core is not covered by the first pattern, that is, a surface of a region of the magnetic core on the magnetic core in which the first wiring layer is etched is higher than or equal to a surface of a region of the magnetic core which is not etched.

Optionally, on the basis of the above embodiments, in order to make a winding pattern on the sidewall easier for direct writing, in a case of multi-layered wiring, it is preferable to perform direct writing of the pattern in a case where the sidewall is easily flattened. For example, for a three-layered transformer structure, a structure of secondary winding (with a smaller number of turns, preferably one turn)-primary winding (with a larger number of turns)-secondary winding (with a smaller number of turns, preferred one turn) is preferred, at this point, it can be ensured that the primary and secondary windings of the transformer are well coupled, and when the number of turns of the primary winding in the middle of the two secondary windings is large, a relatively flat sidewall may effectively reduce the difficulty of direct writing and improve efficiency and yield.

Optionally, on the basis of the above embodiments, in order to make the direct writing process easier, the material of the transition layer may be subjected to a smoothing process (such as grinding, etc.) to obtain an even surface.

Finally, it should be noted that the foregoing embodiments are merely intended to describe the technical solutions in the present disclosure other than limiting the present disclosure. Although the present disclosure is described in detail with reference to the foregoing embodiments, a person of ordinary skill in the art should understand that he may still make modifications to the technical solutions described in the foregoing embodiments, or make equivalent replacements to some or all technical features therein; however, these modifications or replacements do not make essence of corresponding technical solutions depart from the scope of the technical solutions in the embodiments of the present disclosure.

What is claimed is:

1. A magnetic element, comprising:

a magnetic core;

a first metal wiring layer covering a surface of at least one segment of the magnetic core, wherein a portion of the first metal wiring layer is etched to form at least one first pattern to function as a winding, wherein at least one turn of the first pattern surrounds the magnetic core; and a first metal protection layer at least partially covering a region other than the etched portion of the first metal wiring layer, wherein a portion of the first metal protection layer which is in more than one plane is patterned through a direct writing process.

2. The magnetic element according to claim 1, wherein the first metal protection layer comprises tin, tin alloy, gold or gold alloy.

3. The magnetic element according to claim 1, further comprising:

a first transition layer covering the surface of the at least one segment of the magnetic core, wherein the first metal wiring layer covers the first transition layer.

4. The magnetic element according to claim 1, further comprising:

a second transition layer formed at an outer of the first metal wiring layer, wherein the second transition layer comprises at least one hole; and a second metal wiring layer covering the second transition layer, wherein the hole on the second transition layer is used to electrically connect the first metal wiring layer with the second metal wiring layer, and wherein the second metal wiring layer is etched to form at least one second pattern to function as a winding, and at least one turn of the second pattern surrounds the magnetic core.

5. The magnetic element according to claim 1, wherein the magnetic core is an annular body formed by at least one magnetic segment connected end-to-end.

6. The magnetic element according to claim 1, wherein a surface of a region of the magnetic core in which the magnetic core is covered by the first pattern is not smaller than a surface of a region of the magnetic core in which the magnetic core is not covered by the first pattern.

7. The magnetic element according to claim 4, further comprising:

a second metal protection layer at least partially covering a region other than the etched portion of the second metal wiring layer.

8. The magnetic element according to claim 4, wherein each of the first metal wiring layer and the second metal wiring layer is composed of copper or copper alloy.

9. The magnetic element according to claim 7, wherein each of the first metal protection layer and the second metal protection layer is composed of any one of tin, tin alloy, gold or gold alloy.

10. The magnetic element according to claim 9, wherein the first metal protection layer and the second metal protection layer are made of tin or tin alloy, and the first metal protection layer and the second metal protection layer have thicknesses ranging from 1 to 20 um; or the first metal protection layer and the second metal protection layer are made of gold or gold alloy, and the first metal protection layer and the second metal protection layer have thicknesses ranging from 0.1 to 2 um.

11. The magnetic element according to claim 3, wherein the first transition layer is an insulating layer composed of an insulating material.

12. The magnetic element according to claim 1, wherein the first metal protection layer is patterned through the direct writing process.

13. The magnetic element according to claim 12, wherein an incident angle is greater than or equal to 5° during the direct writing process.

14. The magnetic element according to claim 12, wherein the first metal protection layer surrounds the magnetic core at least one turn.

15. The magnetic element according to claim 12, wherein the magnetic core comprises a core window, and the at least one magnetic segment of the magnetic core surrounds the core window.

16. The magnetic element according to claim 15, wherein an intersection angle between an slope and a sidewall of the core window is greater than or equal to 5°, wherein the slope is defined by an intersecting line between the sidewall of the core window at one side and an upper surface of the magnetic core adjacent to the sidewall of the core window at the one side and an intersecting line between a sidewall of the core window at an opposite side and a lower surface of the magnetic core adjacent to the sidewall of the core window at the opposite side.

17. The magnetic element according to claim 15, wherein a portion of the first metal protection layer within the window is patterned through the direct writing process.

* * * * *